(12) United States Patent
Pan et al.

(10) Patent No.: US 10,542,064 B2
(45) Date of Patent: Jan. 21, 2020

(54) METHOD, SERVER SIDE AND SYSTEM FOR COMPUTING BANDWIDTH OF NETWORK TRANSMISSION OF STREAMING MEDIA

(71) Applicant: Hangzhou Hikvision Digital Technology Co., Ltd., Zhejiang (CN)

(72) Inventors: Yadong Pan, Zhejiang (CN); Kui Li, Zhejiang (CN); Xiaoyuan Zhang, Zhejiang (CN)

(73) Assignee: Hangzhou Hikvision Digital Technology Co., Ltd. (CN)

( * ) Notice: Subject to any disclaimer, the term of this patent is extended or adjusted under 35 U.S.C. 154(b) by 126 days.

(21) Appl. No.: 15/742,136

(22) PCT Filed: May 18, 2016

(86) PCT No.: PCT/CN2016/082439
§ 371 (c)(1),
(2) Date: Jan. 5, 2018

(87) PCT Pub. No.: WO2017/005055
PCT Pub. Date: Jan. 12, 2017

(65) Prior Publication Data
US 2018/0205779 A1    Jul. 19, 2018

(30) Foreign Application Priority Data
Jul. 8, 2015    (CN) .......................... 2015 1 0401565

(51) Int. Cl.
*H04L 29/06*      (2006.01)
*H04N 21/238*     (2011.01)
*H04L 1/00*       (2006.01)

(52) U.S. Cl.
CPC .......... *H04L 65/607* (2013.01); *H04L 1/0002* (2013.01); *H04L 1/0009* (2013.01);
(Continued)

(58) Field of Classification Search
CPC ... H04L 67/1095; H04L 69/329; H04L 29/06; H04L 63/1466; H04L 65/80; H04L 1/16;
(Continued)

(56) References Cited

U.S. PATENT DOCUMENTS 6,438,603 B1 *   8/2002   Ogus ...................... H04L 47/10
                                                              370/238
6,993,587 B1 *   1/2006   Basani ................ H04L 67/1095
                                                              709/229
(Continued)

FOREIGN PATENT DOCUMENTS

CN        1930558          3/2007
CN       101262321         9/2008
(Continued)

OTHER PUBLICATIONS

Extended European Search Report dated Jan. 22, 2019; App. No. EP16820706.6; 9 pages.

*Primary Examiner* — Ninos Donabed
(74) *Attorney, Agent, or Firm* — Mark E. Bandy; Rankin Hill & Clark, LLP

(57) ABSTRACT

A method, a server and a system for calculating bandwidth of UDP-based streaming media network transmission. The method includes: dividing video frame data to be sent into a plurality of sub-video frame packets, sending a sub-video frame packet with a preset serial number to a client, and receiving a response message sent by the client, wherein the response message includes a first serial number and a second serial number; sending a sub-video frame packet corresponding to the first serial number to the client, and determining whether the client has received all sub-video frame packets of the video frame data; if so, accurately calculating the actual bandwidth of the current network based on the sending start time of the first sub-video frame packet of the video frame data, the sending end time of the last sub-video
(Continued)

frame packet of the video frame data and the size of the video frame data, which provides a basis for the self-adaption of the encoding rate.

14 Claims, 9 Drawing Sheets

(52) U.S. Cl.
CPC .......... *H04L 1/0014* (2013.01); *H04L 1/0015* (2013.01); *H04L 1/0034* (2013.01); *H04L 29/06* (2013.01); *H04L 65/601* (2013.01); *H04L 65/602* (2013.01); *H04L 65/80* (2013.01); *H04L 67/42* (2013.01); *H04L 69/164* (2013.01); *H04N 21/238* (2013.01)

(58) Field of Classification Search
CPC ............ H04L 29/06027; G06F 21/554; G06F 21/552; G06F 2221/034; G06F 2221/2123; G06F 11/3006; G06F 11/3051; G06F 9/5044; G06Q 30/02; G06Q 30/0261

See application file for complete search history.

(56) References Cited

U.S. PATENT DOCUMENTS

| | | | | |
|---|---|---|---|---|
| 7,451,221 | B2* | 11/2008 | Basani | H04L 67/1095 709/208 |
| 7,747,741 | B2* | 6/2010 | Basani | H04L 69/329 709/219 |
| 8,024,450 | B1* | 9/2011 | Shiyafetdinov | G06F 9/5044 370/401 |
| 2002/0194333 | A1* | 12/2002 | Baek | H04L 12/1836 709/225 |
| 2004/0013121 | A1* | 1/2004 | Higashigawa | H04L 1/16 370/400 |
| 2004/0153491 | A1* | 8/2004 | Harada | H04L 12/1868 709/200 |
| 2004/0215709 | A1* | 10/2004 | Basani | H04L 67/1095 709/201 |
| 2005/0152397 | A1* | 7/2005 | Bai | H04L 1/1887 370/468 |
| 2005/0180415 | A1 | 8/2005 | Cheung et al. | |
| 2005/0198359 | A1* | 9/2005 | Basani | H04L 67/1095 709/232 |
| 2006/0129693 | A1 | 6/2006 | Lecroy et al. | |
| 2007/0097987 | A1* | 5/2007 | Rey | H04L 65/608 370/395.52 |
| 2008/0175383 | A1* | 7/2008 | Sun | H04L 63/029 380/255 |
| 2008/0177861 | A1* | 7/2008 | Basani | H04L 67/1095 709/218 |
| 2010/0020823 | A1* | 1/2010 | Bai | H04L 47/2416 370/468 |
| 2010/0246602 | A1* | 9/2010 | Barreto | H04L 49/90 370/466 |
| 2010/0250767 | A1* | 9/2010 | Barreto | H04L 69/16 709/231 |
| 2011/0103377 | A1* | 5/2011 | Hua | H04L 65/80 370/352 |
| 2012/0099606 | A1* | 4/2012 | Sato | H04N 21/23655 370/468 |
| 2012/0221678 | A1* | 8/2012 | Tanaka | H04L 1/1835 709/217 |
| 2013/0028088 | A1 | 1/2013 | Do et al. | |
| 2013/0229916 | A1* | 9/2013 | Isobe | H04L 1/1854 370/230 |
| 2015/0312572 | A1* | 10/2015 | Owen | H04N 19/102 375/240.02 |

FOREIGN PATENT DOCUMENTS

| | | |
|---|---|---|
| CN | 102123303 | 7/2011 |
| CN | 102404187 | 4/2012 |
| CN | 103905272 | 7/2014 |
| CN | 104283605 | 1/2015 |
| EP | 2506507 | 10/2012 |

\* cited by examiner

METHOD, SERVER SIDE AND SYSTEM FOR COMPUTING BANDWIDTH OF NETWORK TRANSMISSION OF STREAMING MEDIA The present application claims the priority to a Chinese Patent Application No. 201510401565.5, filed with State Intellectual Property Office of People's Republic of China on Jul. 8, 2015 and entitled "method, server and system for calculating bandwidth of network transmission of streaming media", which is incorporated herein by reference in its entirety.

TECHNICAL FIELD

The present application relates to the technical field of streaming media, and particularly to a method, a server and a system for calculating bandwidth of UDP-based streaming media network transmission.

BACKGROUND

Streaming media is a continuous time-based media using streaming transmission technology in the Internet, such as audio, video or multimedia files. Streaming media does not download the whole file before playing, only store beginning partial contents into a RAM. Data streams of the streaming media can be transmitted at any time and then broadcast at any time, and only a certain delay exists at the beginning. Streaming transmission technology is the key technology for the implementation of streaming media.

Nowadays, high definition (HD) video transmission using streaming transmission technology is becoming more and more popular in the field of real-time video surveillance. To ensure the transmission of HD videos, a larger network bandwidth and a more stable network transmission environment are often required. However, in a public network environment, especially in a mobile wireless network, the network environment is dynamically changed. In a dynamically changing network environment, the realization of HD video transmission requires to timely reduce the encoding rate of transmission in case of an insufficient bandwidth, to timely return to the previous encoding rate during normal transmission when the bandwidth is recovered, to quickly perform retransmission in case of packet loss, and to reduce transmission rate jitter in case of network delay jitter. To sum up, in a dynamically changing network environment, it is necessary to meet the requirements of transmission control and network bandwidth self-adaption to achieve HD video transmission.

In the aspect of transmission control, few references are available in the prior art. As everyone knows, in an IP-based network transmission mode, selectable transport layer protocols are only TCP (Transmission Control Protocol, which is a transport layer protocol in the framework of the TCP/IP protocol, and provides reliable connection-oriented transmission) and UDP (User Datagram Protocol, which is a transport layer protocol in the framework of the TCP/IP protocol, and provides unreliable transmission), but which transmission protocol to be used is rarely mentioned in the prior art. If the TCP protocol is used, the transmission rate will be reduced rapidly when packet loss occurs in the network, which has a great impact on surveillance video applications which require real-time transmission. Even if the transmission rate can be quickly recovered using an improved algorithm for the TCP protocol, the increase and decrease of the bit stream transmission rate will occur inevitably, affecting video playing effect. If UDP protocol is used, it is necessary to guarantee the reliability of network transmission.

In the aspect of network bandwidth self-adaption, two kinds of solutions are mainly included in the prior art. One solution is based on the change of a sending buffer: when the network bandwidth becomes smaller, the sending buffer is also getting smaller, and then the encoding rate is reduced. However, after the encoding rate is reduced, the size of the sending buffer will theoretically be close to zero. If the network bandwidth increases again over time, such methods cannot determine the appropriate time to correspondingly increase the encoding rate. Moreover, in a public network, especially in a wireless network, delay jitter or even packet loss occurs very often, which will have a significant impact on the sending buffer. For example, for an encoding rate of 4 Mbps and a sending buffer of 4 Mb, a sporadic delay of one second in a network can make the sending buffer full, and it is obviously inappropriate to further reduce the encoding rate at this time. The other solution is to adjust the encoding rate according to the change of the network bandwidth. However, how to evaluate the current network bandwidth is not disclosed explicitly in the prior art.

In existing network technologies for transmitting real-time videos, it is not inconceivable to adjust the encoding rate according to the change of the network bandwidth. When the network bandwidth is less than the encoding rate, it is easy to get the conclusion that the encoding rate should be reduced, according to the actual amount of transmission. However, after the reduction, if the network bandwidth is getting better, it is hard to figure out what the current network bandwidth actually is after the network bandwidth becomes better because the encoding rate is constant. If the encoding rate is gradually increased in a tentative manner, the network bandwidth must oscillate back and forth around a critical network bandwidth, which leads to a poor display effect finally presented to users. Therefore, how to calculate the actual network bandwidth according to the characteristics of real-time packet generation and transmission is a technical problem required to be solved.

SUMMARY

An objective of the present application is to provide a method, server and system for calculating bandwidth of UDP-based streaming media network transmission, which can accurately calculate the actual bandwidth of the current network, and provides a basis for the self-adaption of the encoding rate.

In a first aspect, embodiments of the present application provide a method for calculating bandwidth of UDP-based streaming media network transmission, which is applicable to a server, wherein the method includes:

dividing video frame data to be sent into a plurality of sub-video frame data units, and encapsulating each sub-video frame data unit into a sub-video frame packet with a preset serial number;

sending sub-video frame packets with preset serial numbers to a client, and recording sending start time;

receiving a response message sent by the client, wherein the response message is generated based on a sub-video frame packet received by the client, and includes a first serial number corresponding to at least one sub-video frame packet that the client requires the server to send and a second serial number for the received sub-video frame packet;

extracting the first serial number and the second serial number from the response message, sending a sub-video frame packet corresponding to the first serial number to the client, and determining whether the client has received all sub-video frame packets of the video frame data based on the second serial number;

if the client has received all sub-video frame packets of the video frame data, recording sending end time of the last sub-video frame packet of the video frame data, and calculating network bandwidth based on the sending start time, the sending end time and the size of the video frame data.

Extracting the first serial number and the second serial number from the response message, sending a sub-video frame packet corresponding to the first serial number to the client, includes:

extracting the first serial number and the second serial number from the response message, and accumulating a retransmission count of the sub-video frame packet corresponding to the first serial number;

sending the sub-video frame packet corresponding to the first serial number associated with the retransmission count to the client if the retransmission count is greater than a preset retransmission threshold.

After extracting the first serial number and the second serial number from the response message, the method further includes:

deleting, from a sending buffer, sub-video frame packets with serial numbers that are smaller than the smallest serial number in the first serial numbers;

decreasing the count of sub-video frame packets which have been sent to the client but for which response messages comprising second serial numbers have not been received according to the number of the deleted sub-video frame packets.

Sending the sub-video frame packet corresponding to the first serial number associated with the retransmission count to the client if the retransmission count is greater than a preset retransmission threshold, includes:

determining whether the number of sub-video frame packets which have been sent to the client but for which response messages comprising second serial numbers have not been received reaches a preset number threshold;

if the number of sub-video frame packets which have been sent to the client but for which response messages comprising second serial numbers have not been received reaches the preset number threshold, selecting, from a sending buffer, a sub-video frame packet whose retransmission count is greater than the preset retransmission threshold according to a preset strategy, and sending the sub-video frame packet to the client;

if the number of sub-video frame packets which have been sent to the client but for which response messages comprising second serial numbers have not been received does not reach the preset number threshold, sending a sub-video frame packet, selected from the sending buffer, whose retransmission count is greater than the preset retransmission threshold, and sending new sub-video frame packets and accumulating the count of sub-video frame packets which have been sent to the client but for which response messages comprising second serial numbers have not been received based on the number of the new sub-video frame packets.

The preset strategy includes: selecting, from the sending buffer, a sub-video frame packet with the smallest serial number in sub-video frame packets whose retransmission counts are greater than the preset retransmission threshold.

Calculating network bandwidth, includes:

calculating a sending rate of a network, the sending rate being B/T; calculating the sum of sending rates for all video frame data sent within preset unit time, and calculating the average of the sum to obtain the network bandwidth;

wherein, B is equal to the sum of the size of the video frame data and the sizes of all sub-video frame packets corresponding to the first serial number sent during the sending of the video frame data, and T is equal to the time interval between the sending start time and the sending end time.

After obtaining the network bandwidth, the method further includes:

adjusting an encoding rate of the transmission of the video frame data according to the network bandwidth.

In a second aspect, embodiments of the present application provide a server for UDP-based streaming media network transmission, which establishes network connection with the client, wherein the server includes:

a dividing and encapsulating unit configured to divide video frame data to be sent into a plurality of sub-video frame data units, and encapsulate each sub-video frame data unit into a sub-video frame packet with a preset serial number;

a sending and recording unit configured to send sub-video frame packets with preset serial numbers to a client, and record sending start time;

a response receiving unit configured to receive a response message sent by the client, wherein the response message is generated based on a sub-video frame packet received by the client, and includes a first serial number corresponding to at least one sub-video frame packet that the client requires the server to send and a second serial number for the received sub-video frame packet;

a serial number extracting unit configured to extract the first serial number and the second serial number from the response message, send a sub-video frame packet corresponding to the first serial number to the client, and determine whether the client has received all sub-video frame packets of the video frame data based on the second serial number;

a bandwidth calculation unit configured to, if a determination result from the serial number extracting unit is YES, record sending end time of the last sub-video frame packet of the video frame data, and calculate network bandwidth based on the sending start time, the sending end time and the size of the video frame data.

Extracting the first serial number and the second serial number from the response message, sending a sub-video frame packet corresponding to the first serial number to the client, includes:

extracting the first serial number and the second serial number from the response message, and accumulating a retransmission count of the sub-video frame packet corresponding to the first serial number;

sending the sub-video frame packet corresponding to the first serial number associated with the retransmission count to the client if the retransmission count is greater than a preset retransmission threshold.

The server further includes:

a deletion unit configured to delete, from a sending buffer, sub-video frame packets with serial numbers that are smaller than the smallest serial number in the first serial numbers;

a decrease unit configured to decrease the count of sub-video frame packets which have been sent to the client but for which response messages comprising second serial numbers have not been received according to the number of the deleted sub-video frame packets.

Sending the sub-video frame packet corresponding to the first serial number associated with the retransmission count to the client if the retransmission count is greater than a preset retransmission threshold, includes:

determining whether the number of sub-video frame packets which have been sent to the client but for which response messages comprising second serial numbers have not been received reaches a preset number threshold;

if the number of sub-video frame packets which have been sent to the client but for which response messages comprising second serial numbers have not been received reaches the preset number threshold, selecting, from the sending buffer, a sub-video frame packet whose retransmission count is greater than the preset retransmission threshold according to a preset strategy, and sending the sub-video frame packet to the client;

if the number of sub-video frame packets which have been sent to the client but for which response messages comprising second serial numbers have not been received does not reach the preset number threshold, sending a sub-video frame packet, selected from the sending buffer, whose retransmission count is greater than the preset retransmission threshold, and sending new sub-video frame packets and accumulating the count of sub-video frame packets which have been sent to the client but for which response messages comprising second serial numbers have not been received based on the number of the new sub-video frame packets.

The preset strategy includes: selecting, from the sending buffer, a sub-video frame packet with the smallest serial number in sub-video frame packets whose retransmission counts are greater than the preset retransmission threshold.

Calculating network bandwidth, includes:

calculating a sending rate of a network, the sending rate being B/T; calculating the sum of sending rates for all video frame data sent within preset unit time, and calculating the average of the sum to obtain the network bandwidth;

wherein, B is equal to the sum of the size of the video frame data and the sizes of all sub-video frame packets corresponding to the first serial number sent during the sending of the video frame data, and T is equal to the time interval between the sending start time and the sending end time.

The server further includes:

an adjustment unit configured to adjust an encoding rate of the transmission of the video frame data according to the network bandwidth.

In a third aspect, embodiments of the present application provide a system for UDP-based streaming media network transmission, wherein the system includes a client and a server for UDP-based streaming media network transmission according to the second aspect of the present application, and the server establishes network connection with the client.

In a fourth aspect, embodiments of the present application provide a storage medium, wherein the storage medium is configured to store an application program that is configured to implement the method for calculating bandwidth of UDP-based streaming media network transmission in the present application when being executed.

In a fifth aspect, embodiments of the present application provide an application program which is configured to implement the method for calculating bandwidth of UDP-based streaming media network transmission when being executed.

In a sixth aspect, embodiments of the present application provide a computing device, which includes a processor, a memory, a communication interface and a bus, wherein the processor, the memory and the communication interface are connected and communicated with each other via the bus;

the memory stores executable program codes;

the processor executes the program corresponding to the executable program codes stored in the memory by reading the executable program codes, to:

divide video frame data to be sent into a plurality of sub-video frame data units, and encapsulate each sub-video frame data unit into a sub-video frame packet with a preset serial number;

send sub-video frame packets with preset serial numbers to a client, and record sending start time;

receive a response message sent by the client, wherein the response message is generated based on a sub-video frame packet received by the client, and includes a first serial number corresponding to at least one sub-video frame packet that the client requires the server to send and a second serial number for the received sub-video frame packet;

extract the first serial number and the second serial number from the response message, send a sub-video frame packet corresponding to the first serial number to the client, and determine whether the client has received all sub-video frame packets of the video frame data based on the second serial number;

if the client has received all sub-video frame packets of the video frame data, record sending end time of the last sub-video frame packet of the video frame data, and calculate network bandwidth based on the sending start time, the sending end time and the size of the video frame data.

Compared to the prior art, one or more embodiments of the above solutions may have the following advantages or beneficial effects.

The present application provides a method, server and system for calculating bandwidth of UDP-based streaming media network transmission. The method includes: dividing video frame data to be sent into a plurality of sub-video frame packets; sending a sub-video frame packet with a preset serial number to a client, and receiving a response message sent by the client, wherein the response message includes a first serial number corresponding to at least one sub-video frame packet that the client requires the server to send and a second serial number for the received sub-video frame packet; sending a sub-video frame packet corresponding to the first serial number to the client, and determining whether the client has received all sub-video frame packets of the video frame data, based on the first serial number and the second serial number; if the client has received all sub-video frame packets of the video frame data, calculating network bandwidth based on the sending start time of the first sub-video frame packet of the video frame data, the sending end time of the last sub-video frame packet of the video frame data and the size of the video frame data. From above, the method, server and system for calculating bandwidth of UDP-based streaming media network transmission can accurately calculate the actual bandwidth of the current network, and provides a basis for the self-adaption of the encoding rate.

Other features and advantages of the present application will be explained in the following description, and partially become apparent from the description, or are understood through the technical solutions of the present application. The objectives and other advantages of the present application can be achieved and obtained through the structures and/or processes specified in the description, claims and accompanying drawings.

BRIEF DESCRIPTION OF THE DRAWINGS

In order to describe the technical solutions in the embodiments of the present application and the prior art more clearly, drawings required for embodiments of the present application and the prior art will be described briefly below. It is obvious that the drawings below are for only some embodiments of the present application and those skilled in the art can also obtain further drawings based on these drawings without any creative efforts.

DETAILED DESCRIPTION

In order to make the objections, technical solutions as well as advantages of the present application more apparent and understandable, the present application will be described in more detail below with reference to the appended drawings and embodiments. It should be understood that these descriptions are only illustrative and not intended to limit the scope of the present application. In addition, in the following description, the description of known structures and technologies is omitted to avoid unnecessarily confusing the concept of the present application.

Embodiment 1

Figure 1:
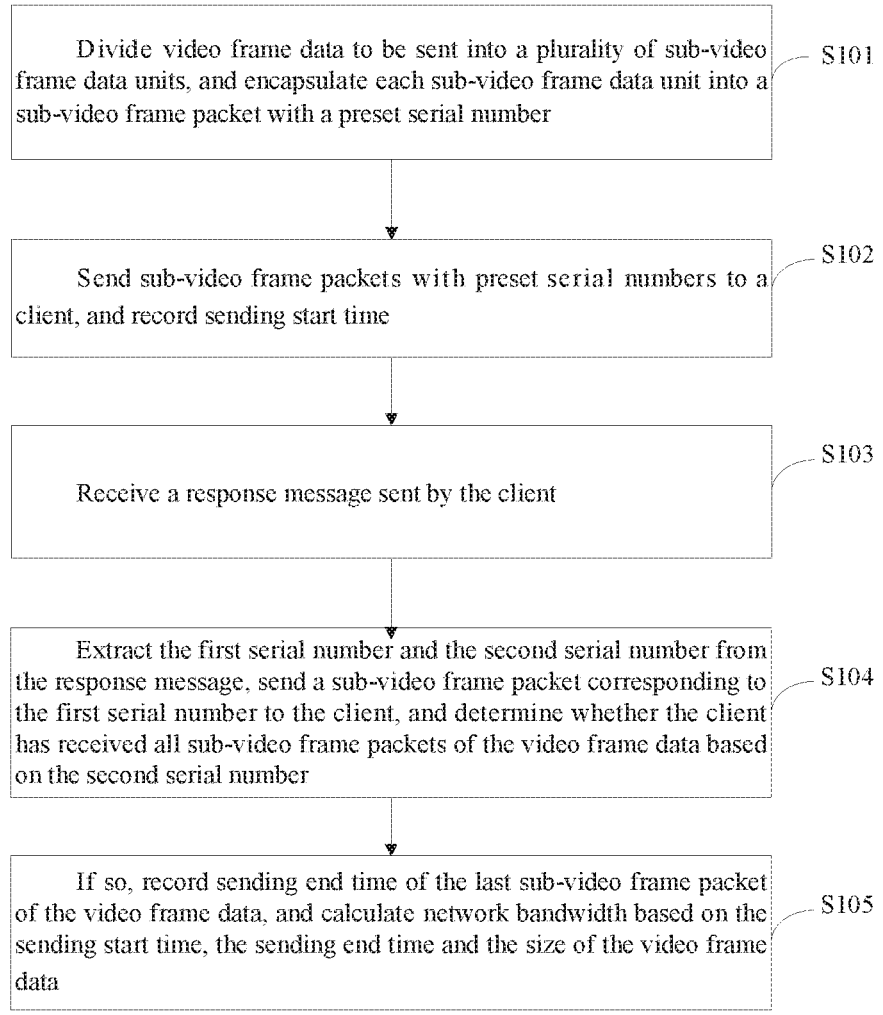
FIG. 1 is a flowchart of a method for calculating bandwidth of UDP-based streaming media network transmission according to a first embodiment of the present application.

FIG. 1 is a flowchart of a method for calculating bandwidth of UDP-based streaming media network transmission according to a first embodiment of the present application.

The method for calculating bandwidth of UDP-based streaming media network transmission according to the first embodiment of the present application is applicable to a server, and includes S101-S105.

S101. Divide video frame data to be sent into a plurality of sub-video frame data units, and encapsulate each sub-video frame data unit into a sub-video frame packet with a preset serial number.

Preferably, the preset serial number is an Arabic numeral number, such as 1, 2, 3 and so forth.

Video frame data is the data unit in communication transmission based on the UDP protocol. In a data switching network, video frame data needs to be divided into a plurality of sub-video frame data units, each of which is encapsulated into a sub-video frame packet. Each sub-video frame packet includes both sender and receiver address information. Different sub-video frame packets are transmitted in one or more switching networks along identical or different paths, and recombined at the destination to form the original video frame data.

Preferably, the video frame data is applicable to HD video transmission in the field of real-time video surveillance.

Figure 2:
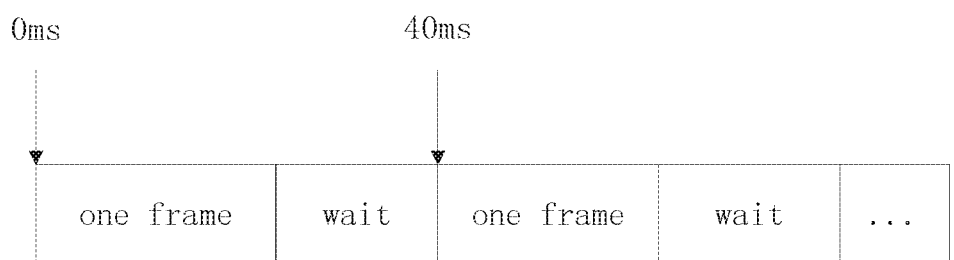
FIG. 2 is a diagram illustrating transmission law of video frame data in UDP-based streaming media network transmission according to the first embodiment of the present application.

FIG. 2 is a diagram illustrating transmission law of video frame data in UDP-based streaming media network transmission according to the first embodiment of the present application.

Generally, data encoding has a frame rate, that is, one frame of data is generated at a regular interval, and the transmission time of each frame depends on the actual bandwidth. For real-time display, real-time video surveillance field requires these video frame data to be sent out immediately, so that the law of video transmission is as shown in FIG. 2, in which 25 frames per second is taken as an example. Assuming that the actual bandwidth is 4 Mbps and the length of one frame of data generated at 0 ms is 100 Kb, this frame of data can be transmitted completely for about 25 ms, and the remaining 15 ms is idle. This is the real-time video surveillance data transmission characteristics. A relatively accurate network bandwidth can be obtained if transmission rate of the data packet is obtained through statistics in frames instead of unit time.

Figure 3:
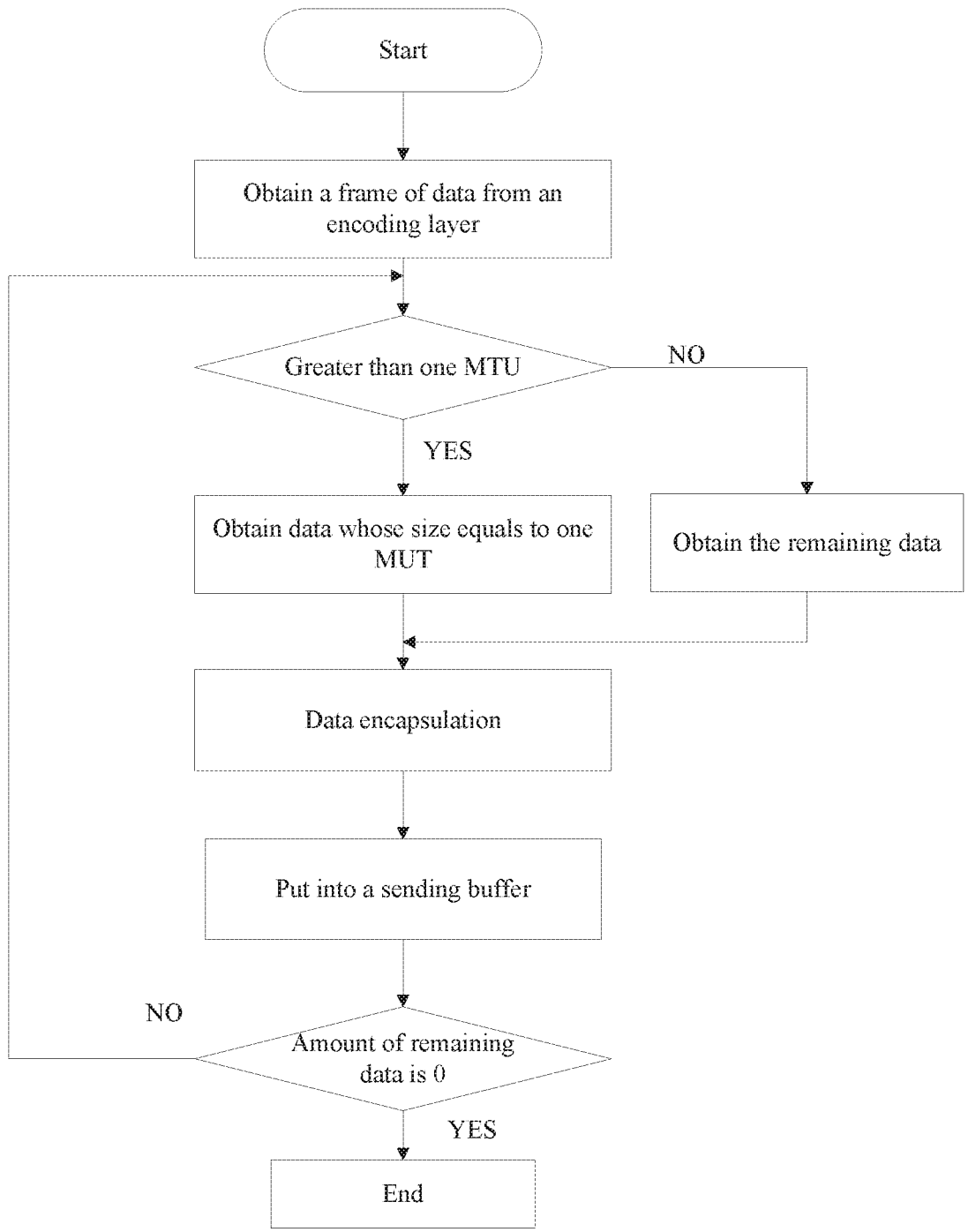
FIG. 3 is a flowchart of dividing and encapsulating a packet in UDP-based streaming media network transmission according to the first embodiment of the present application.

FIG. 3 is a flowchart of dividing and encapsulating a packet in UDP-based streaming media network transmission according to the first embodiment of the present application.

The processing procedure of video frame data obtained from an encoding layer is as shown in FIG. 3. In the actual sending process, one frame of data cannot be sent with one UDP, otherwise the video frame data may be too large. In the actual video frame data transmission process, one frame of data is generally divided into several UDP sub-video frame packets smaller than or equal to MTU (Maximum Transmission Unit, which is the size of the largest packet that can pass a certain layer in a communication protocol), and if one frame of data is transmitted by using one UDP video frame packet, the transmission failure occurs due to the fact that the UDP video frame packet is too large. By statistically obtaining time intervals experienced by all sub-video frame packets included in each video frame data from being sent and then receiving a corresponding ACK until being deleted from the buffer, the corresponding transmission rate can be calculated. Further, since packet loss and delay jitter may occur in the Internet, it is possible to calculate the sum of sending rates for all video frame packets within unit time, then calculate the average of the sum and finally obtain network bandwidth. After the network bandwidth is obtained, the encoding rate can be adjusted according to the obtained network bandwidth.

An index can be established for each sub-video frame packet, and the index includes:

total data length represented by 2 bytes;

data type represented by 1 byte, i.e., video data;

frame sequence represented by 1 byte, wherein the frame sequence includes frame start 0, frame intermediate 1-0xfe, frame end 0xff and full frame 0xff; if the data of one frame is relatively large, and when the data should be divided according to the MTU, it is required to perform type value assignment according to the frame type to facilitate recording the time when video frame data starts to be sent during the sending of data; here, the frame sequence is represented by one byte; if the maximum frame size is more than MTU*256, the frame sequence can be expanded to be represented by two bytes; and frame serial number represented by 4 bytes, i.e., the preset serial number, wherein all frame data is uniformly numbered, from 0, increasing by one each time.

S102. Send sub-video frame packets with preset serial numbers to a client, and record sending start time.

S103. Receive a response message sent by the client.

The response message is generated based on a sub-video frame packet received by the client, and includes a first serial number corresponding to at least one sub-video frame packet that the client requires the server to send and a second serial number for the received sub-video frame packet.

In the network, the UDP protocol is the same as the TCP protocol for processing packets, and is a connectionless protocol. In the OSI model, it is located in the fourth layer, i.e., the transport layer, which is one layer above the IP protocol. The method for calculating bandwidth of UDP-based streaming media network transmission according to the first embodiment of the present application solves the problem of reliably transmitting video frame data in a dynamically changing network environment by using the UDP protocol. First, each sub-video frame packet to be transmitted is numbered by a server. Then, a client, after receiving this sub-video frame packet, returns a response message (corresponding to ACK (acknowledgment) as mentioned hereinafter) to the server so as to acknowledge the server that the sub-video frame packet corresponding to the serial number has been received. Finally, if packet loss occurs, the client will inform the server to retransmit the lost sub-video frame packet.

The first serial number corresponding to a serial number of a sub-video frame packet that the client wishes the server to subsequently send includes: a serial number of the subsequent sub-video frame packet according to a normal sequence, and a serial number of the sub-video frame packet that the client wishes the server to send again when network packet loss occurs. The second serial number is a serial number of the sub-video frame packet which is sent by a server and received by a client.

In order to ensure the number of sub-video frame packets sent under the conditions of network delay and certain packet loss rate, the first serial number contained in a response message sent to the server by the client each time may be more than one. The client obtains the situation of the existing sub-video frame packets in a receiving buffer area of the client, and sends at a time a plurality of pieces of serial number information of sub-video frame packets that are required to be sent by the server, according to the serial numbers of the existing sub-video frame packets, i.e., one first serial number contains a plurality of pieces of serial number information, to ensure the timeliness of network transmission.

Figure 4:
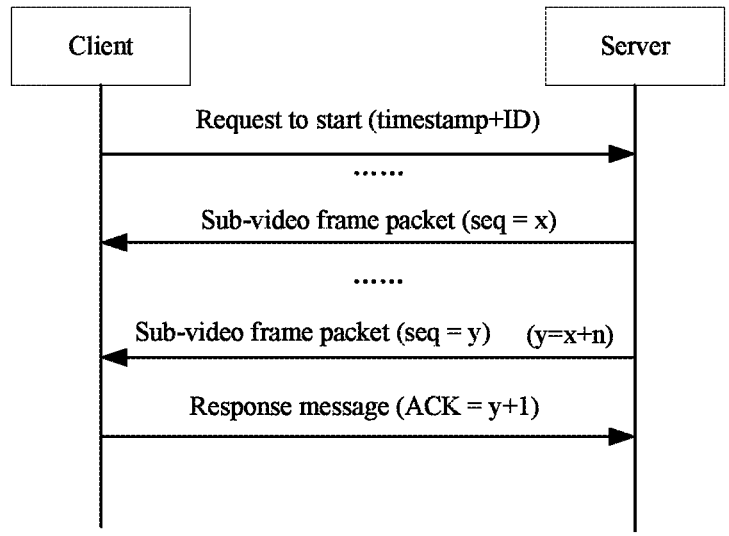
FIG. 4 is a sequence diagram of network transmission applying the method for calculating bandwidth of UDP-based streaming media network transmission according to the first embodiment of the present application.

FIG. 4 is a network transmission sequence diagram applying the method for calculating bandwidth of UDP-based streaming media network transmission according to the first embodiment of the present application. The n in the figure represents the total number of sub-video frame packets sent by the server before it does not receive ACK. The first serial number contained in ACK is equivalent to the serial number of subsequent sub-video frame packet that the client wishes the server to send.

Figure 5:
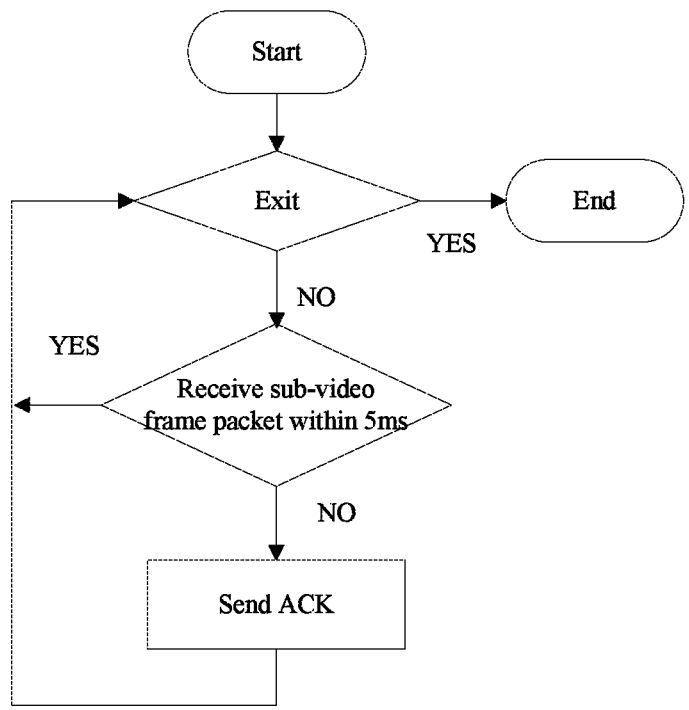
FIG. 5 is a schematic diagram illustrating a first occasion when a response message is sent in UDP-based streaming media network transmission according to the first embodiment of the present application.
Figure 6:
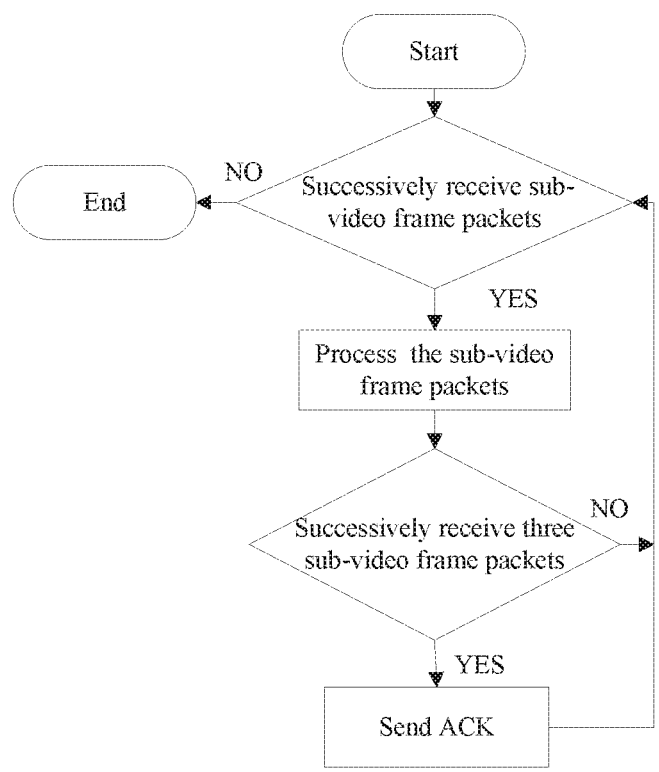
FIG. 6 is a schematic diagram illustrating a second occasion when a response message is sent in UDP-based streaming media network transmission according to the first embodiment of the present application.

FIGS. 5 and 6 are schematic diagrams illustrating a first occasion and a second occasion when a response message is sent in UDP-based streaming media network transmission according to the first embodiment of the present application respectively.

The occasions when a response message is sent in UDP-based streaming media network transmission includes: the first occasion and the second occasion.

The first occasion is a time when the client has not received a sub-video frame packet within a preset duration. At this time, the client generates a response message based on the received sub-video frame packets and sends the response message.

The second occasion is a time when the number of sub-video frame packets successively received by the client reaches a preset number. At this time, the client generates a response message based on the received sub-video frame packets and then sends the response message.

Preferably, the preset number is three, and the preset duration is 5 ms.

The client sends ACK to the server in the following cases: first, when a timer does not receive a sub-video frame packet for 5 ms and the sub-video frame packet is sent over time, corresponding to FIG. 5; second, when three sub-video frame packets are successively received, corresponding to FIG. 6. Although such a sending mechanism may generate redundant data, it also can ensure that the ACK can reach the server in time even when there is packet loss in both transmission directions. The transmission pressure of sub-video frame packets is generally concentrated in the direction from the server to the client, redundant data generated in the direction from the client to the server substantially has no influence on network transmission.

S104. Extract the first serial number and the second serial number from the response message, send a sub-video frame packet corresponding to the first serial number to the client, and determine whether the client has received all sub-video frame packets of the video frame data based on the second serial number.

S105. If the client has received all sub-video frame packets of the video frame data, record the sending end time of the last sub-video frame packet of the video frame data, and calculate network bandwidth based on the sending start time, the sending end time and the size of the video frame data.

The method for calculating bandwidth of UDP-based streaming media network transmission provided by the first embodiment of the present application includes: dividing video frame data to be sent into a plurality of sub-video frame packets, sending a sub-video frame packet with a preset serial number to a client, and receiving a response message sent by the client, wherein the response message includes a first serial number corresponding to at least one sub-video frame packet that the client requires the server to send and a second serial number for the received sub-video frame packet; sending a sub-video frame packet corresponding to the first serial number to the client, and determining whether the client has received all sub-video frame packets of the video frame data, based on the first serial number and the second serial number; if the client has received all sub-video frame packets of the video frame data, calculating the current actual network bandwidth based on the sending start time of the first sub-video frame packet of the video frame data, the sending end time of the last sub-video frame packet of the video frame data and the size of the video frame data. The method can accurately calculate the actual bandwidth of the current network and provides a basis for the self-adaption of the encoding rate.

Embodiment 2

Figure 7:
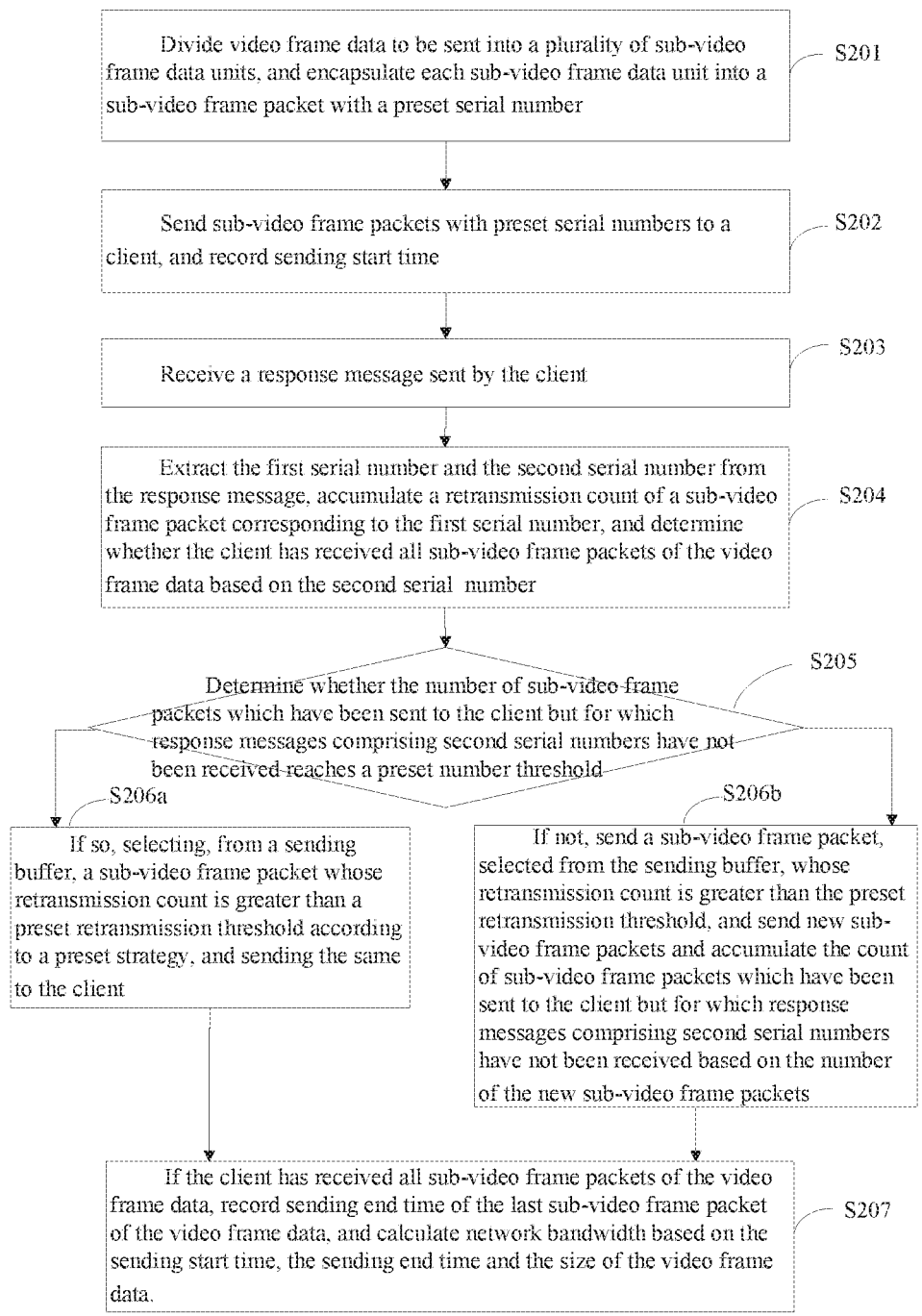
FIG. 7 is a flowchart of a method for calculating bandwidth of UDP-based streaming media network transmission according to a second embodiment of the present application.

FIG. 7 is a flowchart of a method for calculating bandwidth of UDP-based streaming media network transmission according to a second embodiment of the present application. The specific description of retransmission of a sub-video frame packet when network packet loss occurs is added in the second embodiment, on the basis of the first embodiment of the method for calculating bandwidth of UDP-based streaming media network transmission.

The method for calculating bandwidth of UDP-based streaming media network transmission according to the second embodiment of the present application includes S201-S207.

S201. Divide video frame data to be sent into a plurality of sub-video frame data units, and encapsulate each sub-video frame data unit into a sub-video frame packet with a preset serial number.

S202. Send sub-video frame packets with preset serial numbers to a client, and record sending start time.

S203. Receive a response message sent by the client.

The response message is generated based on a sub-video frame packet received by the client, and includes a first serial number corresponding to at least one sub-video frame packet that the client requires the server to send and a second serial number for the received sub-video frame packet.

S204. Extract the first serial number and the second serial number from the response message, accumulate a retransmission count of a sub-video frame packet corresponding to the first serial number, and determine whether the client has received all sub-video frame packets of the video frame data based on the second serial number.

S205. Determine whether the number of sub-video frame packets which have been sent to the client but for which response messages comprising second serial numbers have not been received reaches a preset number threshold.

In order to avoid that too many sub-video frame packets are sent by the sever at one time which leads to unnecessary packet loss, a maximum value (corresponding to the preset number threshold) can be set for the total number of sub-video frame packets that have been sent but not acknowledged (i.e., for which response messages comprising second serial numbers have not been received). When this preset number threshold is exceeded, the server only retransmits the sub-video frame packets and does not send new sub-video frame packets, so as to avoid unnecessary packet loss. The preset number threshold is in direct proportion to the size of the receiving buffer of the client, and can be set according to actual situations, which will not be described in detail here.

S206a. If the number of sub-video frame packets which have been sent to the client but for which response messages comprising second serial numbers have not been received reaches the preset number threshold, select, from the sending buffer, a sub-video frame packet whose retransmission count is greater than a preset retransmission threshold according to a preset strategy, and send the sub-video frame packet to the client;

S206b. If the number of sub-video frame packets which have been sent to the client but for which response messages comprising second serial numbers have not been received does not reach the preset number threshold, send a sub-video frame packet, selected from the sending buffer, whose retransmission count is greater than the preset retransmission threshold, and send new sub-video frame packets and accumulate the count of sub-video frame packets which have been sent to the client but for which response messages comprising second serial numbers have not been received based on the number of new sub-video frame packets.

Preferably, the preset retransmission threshold is 3 or 5. When the accumulated retransmission count of a sub-video frame packet is greater than the preset retransmission threshold, a case is generally excluded in which the sub-video frame packet reaches the client late due to network delay and the server mistakes it for packet loss. The rest is the lost sub-video frame packet (a sub-video frame data packet whose retransmission count accumulated is greater than the preset retransmission threshold), and the sub-video frame packet really need to be retransmitted through network. This setting reduces the two-way pressure when the server retransmits the sub-video frame packet and the client receives the retransmitted sub-video frame packet.

After receiving the ACK, the server adds 1 to the retransmission count of the sub-video frame packet of a serial number corresponding to the ACK, and then accumulates incrementally. When the accumulated retransmission count exceeds the preset retransmission threshold, the server immediately starts the retransmission of the sub-video frame packet, which ensures the timeliness of the retransmission of the sub-video frame packet.

Preferably, the preset strategy includes: selecting, from the sending buffer, a sub-video frame packet with the smallest serial number in sub-video frame packets whose retransmission counts are greater than the preset retransmission threshold.

Of course, the preset strategy can include: selecting, from the sending buffer, the first several sub-video frame packets with smaller serial numbers in the sub-video frame packets whose retransmission counts are greater than the preset retransmission threshold. It can be specifically set according to the network bandwidth and the size of the buffer, which will not be described in detail here.

S207. If the client has received all sub-video frame packets of the video frame data, recording sending end time of the last sub-video frame packet of the video frame data, and calculating network bandwidth based on the sending start time, the sending end time and the size of the video frame data.

The method for calculating bandwidth of UDP-based streaming media network transmission provided by the second embodiment of the present application forms a new and reliable transmission protocol. It not only ensures the reliability of network transmission, but also ensures the timeliness of video frame data transmission. When packet loss occurs in the network, the transmission rate will not be greatly reduced and transmission rate jitter is smaller, which ensures the timeliness and fluency of real-time video transmission.

The method for calculating bandwidth of UDP-based streaming media network transmission provided by the second embodiment of the present application not only accurately calculates the actual bandwidth of the current network, but also ensures the timeliness of sub-video frame packet retransmission. When packet loss appears in the network, the sending rate will not be greatly reduced when the lost sub-video frame packets need to be retransmitted, which satisfies the real-time requirement of real-time video surveillance.

Embodiment 3

Figure 8:
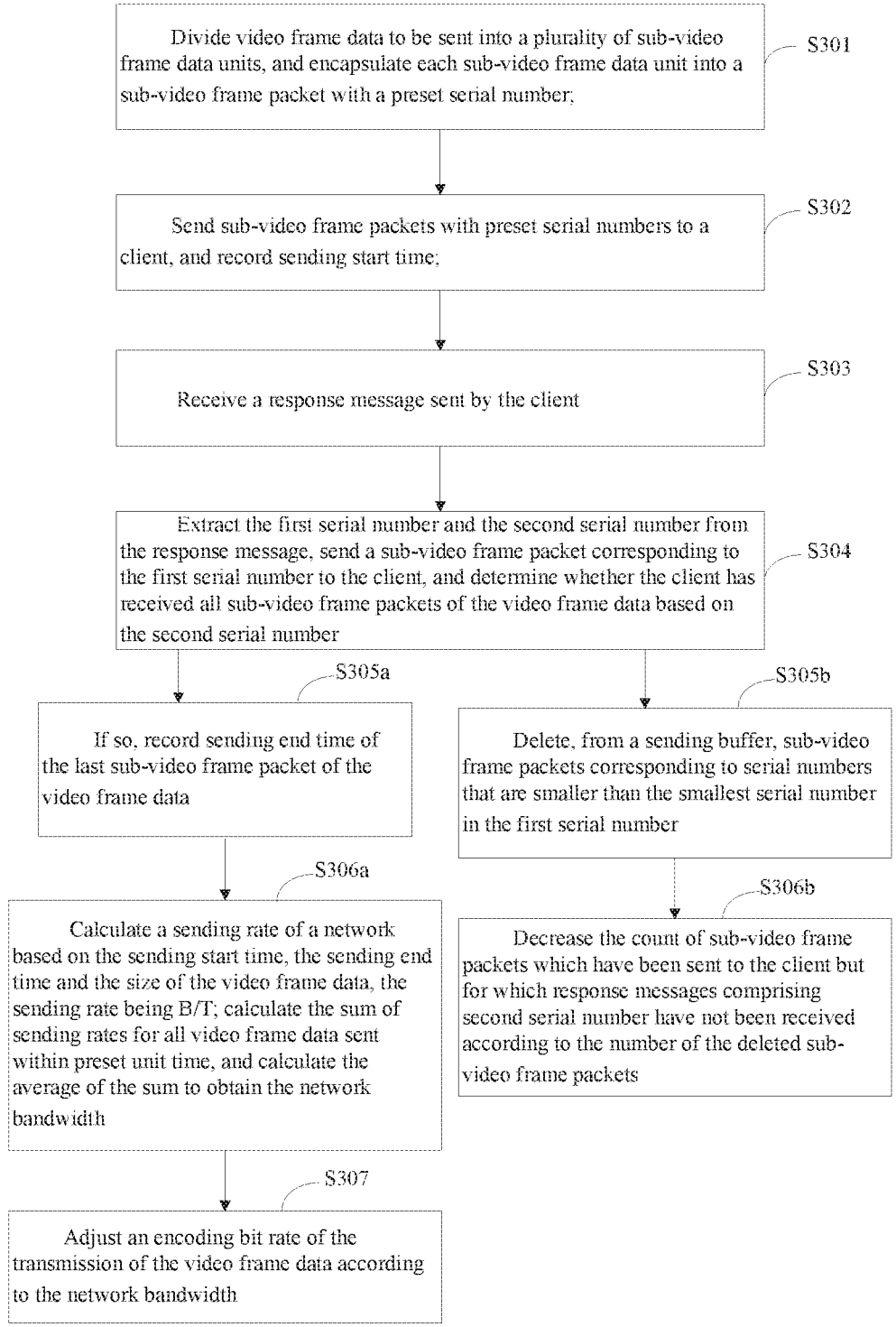
FIG. 8 is a flowchart of a method for calculating bandwidth of UDP-based streaming media network transmission according to a third embodiment of the present application.

FIG. 8 is a flowchart of a method for calculating bandwidth of UDP-based streaming media network transmission according to the third embodiment of the present application. The specific description of the calculation procedure of the actual bandwidth of the current network and the adjustment procedure of the encoding rate based on the network bandwidth is added in the third embodiment on the basis of the method for calculating bandwidth of UDP-based streaming media network transmission according to the first embodiment.

The method for calculating bandwidth of UDP-based streaming media network transmission according to the third embodiment of the present application includes S301-S307.

S301. Divide video frame data to be sent into a plurality of sub-video frame data units, and encapsulate each sub-video frame data unit into a sub-video frame packet with a preset serial number.

S302. Send sub-video frame packets with preset serial numbers to a client, and record sending start time.

S303. Receive a response message sent by the client.

Wherein the response message is generated based on a sub-video frame packet received by the client, and includes a first serial number corresponding to at least one sub-video frame packet that the client requires the server to send and a second serial number for the received sub-video frame packet.

S304. Extract the first serial number and the second serial number from the response message, send a sub-video frame packet corresponding to the first serial number to the client, and determine whether the client has received all sub-video frame packets of the video frame data based on the second serial number.

S305a. If the client has received all sub-video frame packets of the video frame data, record sending end time of the last sub-video frame packet of the video frame data.

S305b. Delete, from a sending buffer, a sub-video frame packet with a serial number that is smaller than the smallest serial number in the first serial numbers.

S306a. Calculate a sending rate of a network based on the sending start time, the sending end time and the size of the video frame data, the sending rate being B/T; calculate the sum of sending rates for all video frame data sent within preset unit time, and calculate the average of the sum to obtain the network bandwidth.

B is equal to the sum of the size of the video frame data and the sizes of all sub-video frame packets corresponding to the first serial number sent during the sending of the video frame data. T is equal to the time interval between the sending start time and the sending end time.

Figure 9:
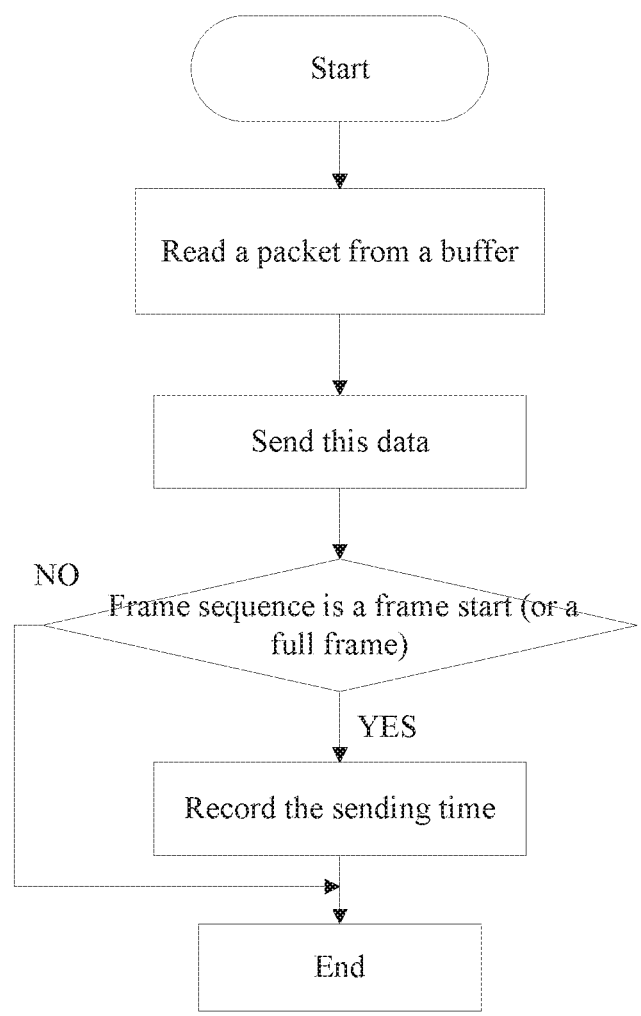
FIG. 9 is a flowchart of a data sending thread in UDP-based streaming media network transmission according to the third embodiment of the present application.
Figure 10:
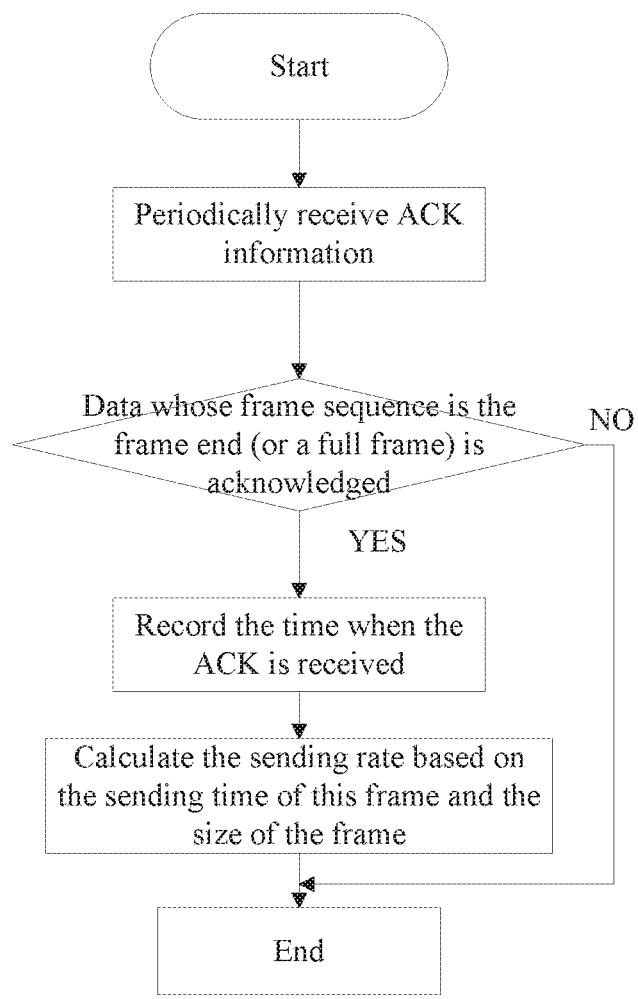
FIG. 10 is a flowchart of a data receiving thread in UDP-based streaming media network transmission according to the third embodiment of the present application.

FIGS. 9 and 10 are flowcharts of sending and receiving data in UDP-based streaming media network transmission applying the third embodiment of the present application respectively.

Since video frame data are sent in an order that sub-video frame packets are sent one after another, and the response message is acknowledged in an order that sub-video frame packets are acknowledged one after another, when information indicating that all sub-video frame packets are sent is received, which certainly corresponds to the recorded sending start time of the first sub-video frame packet, the time interval can be calculated. It is considered that the sending rate within this time interval is the sending rate of this video frame data, that is, the network bandwidth (in seconds). In the real network, there are network fluctuations. In order to obtain more accurate network bandwidth, the sum of the sending rates of all video frame data within preset unit time, preferably one second, can be calculated and the average of the sum can be calculated.

S306b. Decrease the count of sub-video frame packets which have been sent to the client but for which response messages comprising second serial numbers have not been received according to the number of the deleted sub-video frame packets.

Real-time cleaning, from the sending buffer of the server, sub-video frame packets which have been sent to the client and for which response messages have been received, and correspondingly adjusting the count of sub-video frame packets which have been sent to the client but for which response messages have not been received facilitate the transmission of sub-video frame packets and make the transmission of sub-video frame packets smoother.

It should be noted that, there is no sequential relationship between step S305a and step S305b, which are implemented alternatively or in parallel. There is no sequential relationship between step S306a and step S306b, which are implemented alternatively or in parallel.

S307. Adjust the encoding rate of the transmission of the video frame data according to the network bandwidth.

In the method for calculating bandwidth of UDP-based streaming media network transmission provided by the third embodiment of the present application, a network bandwidth prediction method is provided based on the UDP protocol in conjunction with the periodic characteristics of real-time video encoding. By statistically obtaining the actual transmission time of each video frame packet, the actual bandwidth of the current network can be accurately calculated, which provides a basis for the self-adaption of the encoding rate.

An embodiment of a server for UDP-based streaming media network transmission provided by an embodiment of the present application is as follows. The embodiment of a server for UDP-based streaming media network transmission belongs to the same concept as the embodiment of the method for calculating bandwidth of UDP-based streaming media network transmission. For the content that is not described in detail in the embodiment of a server for UDP-based streaming media network transmission, reference can be made to the embodiments of the method for calculating bandwidth of UDP-based streaming media network transmission.

Embodiment 4

Figure 11:
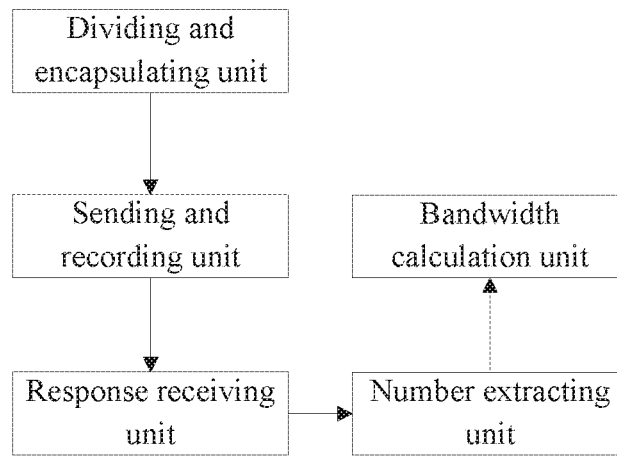
FIG. 11 is a structural block diagram of a server for UDP-based streaming media network transmission according to a fourth embodiment of the present application.

FIG. 11 is a structural block diagram of the server for UDP-based streaming media network transmission according to the fourth embodiment of the present application. The server is used to send real-time video data in network communication, which can be regarded as a video monitoring device herein. The client that establishes network connection with the server is used to receive real-time video frame data in network communication, which can be regarded as a device network software development kit (SDK) herein.

The fourth embodiment of the present application provides a server for UDP-based streaming media network transmission, which establishes network connection with the client and includes a dividing and encapsulating unit, a sending and recording unit, a response receiving unit, a serial number extracting unit and a bandwidth calculation unit.

The dividing and encapsulating unit is configured to divide video frame data to be sent into a plurality of sub-video frame data units, and encapsulate each sub-video frame data unit into a sub-video frame packet with a preset serial number.

The sending and recording unit is configured to send sub-video frame packets with preset serial numbers to a client, and record sending start time.

The response receiving unit is configured to receive a response message sent by the client, wherein the response message is generated based on a sub-video frame packet received by the client, and includes a first serial number corresponding to at least one sub-video frame packet that the client requires the server to send and a second serial number for the received sub-video frame packet.

The serial number extracting unit is configured to extract the first serial number and the second serial number from the response message, send a sub-video frame packet corresponding to the first serial number to the client, and determine whether the client has received all sub-video frame packets of the video frame data based on the second serial number.

The bandwidth calculation unit is configured to, if a determination result from the serial number extracting unit is YES, record sending end time of the last sub-video frame packet of the video frame data, and calculate network bandwidth based on the sending start time, the sending end time and the size of the video frame data.

The server for calculating bandwidth of UDP-based streaming media network transmission provided by the fourth embodiment of the present application is used for: dividing video frame data to be sent into a plurality of sub-video frame packets, sending a sub-video frame packet with a preset serial number to a client, and receiving a response message sent by the client, wherein the response message includes a first serial number corresponding to at least one sub-video frame packet that the client requires the server to send and a second serial number for the received sub-video frame packet; sending a sub-video frame packet corresponding to the first serial number to the client, and determining whether the client has received all sub-video frame packets of the video frame data, based on the first serial number and the second serial number; if the client has received all sub-video frame packets of the video frame data, calculating the actual bandwidth of the current network based on the sending start time of the first sub-video frame packet of the video frame data, the sending end time of the last sub-video frame packet of the video frame data and the size of the video frame data, which provides a basis for the self-adaption of the encoding rate.

Embodiment 5

Figure 12:
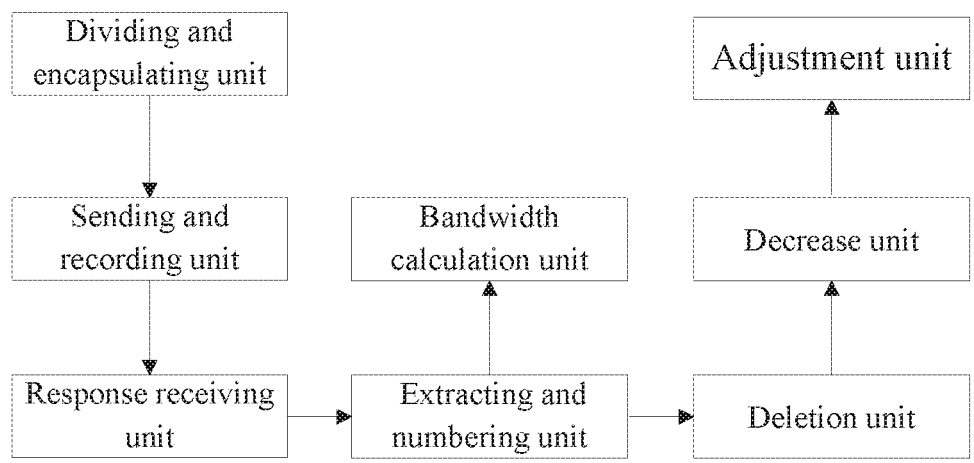
FIG. 12 is a structural block diagram of a server for UDP-based streaming media network transmission according to a fifth embodiment of the present application.

FIG. 12 is a structural block diagram of a server for UDP-based streaming media network transmission according to the fifth embodiment of the present application. Based on the fourth embodiment of the server for UDP-based streaming media network transmission, in the fifth embodiment, the server further includes a deletion unit, a decrease unit and an adjustment unit.

The fifth embodiment of the present application provides a server for UDP-based streaming media network transmission, which establishes network connection with the client and includes a dividing and encapsulating unit, a sending and recording unit, a response receiving unit, a serial number extracting unit and a bandwidth calculation unit.

The dividing and encapsulating unit is configured to divide video frame data to be sent into a plurality of sub-video frame data units, and encapsulate each sub-video frame data unit into a sub-video frame packet with a preset serial number.

The sending and recording unit is configured to send sub-video frame packet with preset serial numbers to a client, and record sending start time.

The response receiving unit is configured to receive a response message sent by the client, wherein the response message is generated based on a sub-video frame packet received by the client, and includes a first serial number corresponding to at least one sub-video frame packet that the client requires the server to send and a second serial number for the received sub-video frame packet.

The serial number extracting unit is configured to extract the first serial number and the second serial number from the response message, send a sub-video frame packet corresponding to the first serial number to the client, and determine whether the client has received all sub-video frame packets of the video frame data based on the second serial number.

The bandwidth calculation unit is configured to, if a determination result from the serial number extracting unit is YES, record sending end time of the last sub-video frame packet of the video frame data, and calculate network bandwidth based on the sending start time, the sending end time and the size of the video frame data.

Extracting the first serial number and the second serial number from the response message, sending a sub-video frame packet corresponding to the first serial number to the client, includes:

extracting the first serial number and the second serial number from the response message, and accumulating a retransmission count of the sub-video frame packet corresponding to the first serial number; and sending the sub-video frame packet corresponding to the first serial number associated with the retransmission count to the client if the retransmission count is greater than a preset retransmission threshold.

The server further includes a deletion unit and a decrease unit.

The deletion unit is configured to delete, from a sending buffer, sub-video frame packets with serial numbers that are smaller than the smallest serial number in the first serial numbers.

The decrease unit is configured to decrease the count of sub-video frame packets which have been sent to the client but for which response messages comprising second serial numbers have not been received according to the number of the deleted sub-video frame packets.

Sending the sub-video frame packet corresponding to the first serial number associated with the retransmission count to the client if the retransmission count is greater than a preset retransmission threshold includes:

determining whether the number of sub-video frame packets which have been sent to the client but for which response messages comprising second serial numbers have not been received reaches a preset number threshold;

if the number of sub-video frame packets which have been sent to the client but for which response messages comprising second serial numbers have not been received reaches the preset number threshold, selecting, from the sending buffer, a sub-video frame packet whose retransmission count is greater than a preset retransmission threshold according to a preset strategy, and sending the sub-video frame packet to the client;

if the number of sub-video frame packets which have been sent to the client but for which response messages comprising second serial numbers have not been received does not reach the preset number threshold, sending a sub-video frame packet, selected from the sending buffer, whose retransmission count is greater than the preset retransmission threshold, and sending new sub-video frame packets and accumulating the count of sub-video frame packets which have been sent to the client but for which response messages comprising second serial numbers have not been received based on the number of the new sub-video frame packets.

The preset strategy includes: selecting, from the sending buffer, a sub-video frame packet with the smallest serial number in sub-video frame packets whose retransmission counts are greater than the preset retransmission threshold.

Calculating network bandwidth, includes:

calculating a sending rate of a network, the sending rate being B/T; calculating the sum of sending rates for all video frame data sent within preset unit time, and calculating the average of the sum to obtain the network bandwidth;

wherein, B is equal to the sum of the size of the video frame data and the sizes of all sub-video frame packets corresponding to the first serial number sent during the sending of the video frame data, and T is equal to the time interval between the sending start time and the sending end time.

The server further includes an adjustment unit.

The adjustment unit is configured to adjust the encoding rate of the transmission of the video frame data according to the network bandwidth.

For the server for calculating bandwidth of UDP-based streaming media network transmission provided by the fifth embodiment of the present application, a network bandwidth prediction method is provided based on the UDP protocol in conjunction with the periodic characteristics of real-time video encoding. By statistically obtaining the actual transmission time of each video frame packet, the actual bandwidth of the current network can be accurately calculated, which provides a basis for the self-adaption of the encoding rate.

An embodiment of a system for UDP-based streaming media network transmission provided by an embodiment of the present application is as follows. The embodiment of a system for UDP-based streaming media network transmission belongs to the same concept as the embodiment of the method for calculating bandwidth of UDP-based streaming media network transmission. For the content that is not described in detail in the embodiment of a system for UDP-based streaming media network transmission, reference can be made to the embodiments of the method for calculating bandwidth of UDP-based streaming media network transmission.

Embodiment 6

Figure 13:
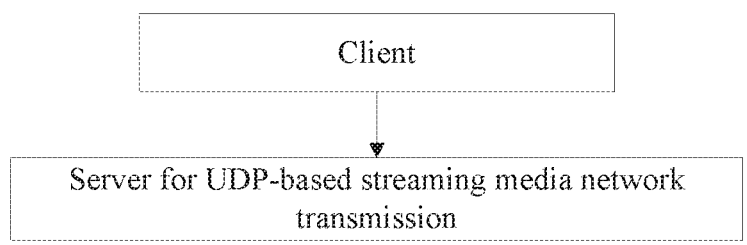
FIG. 13 is a structural block diagram of a system for UDP-based streaming media network transmission according to a sixth embodiment of the present application.

FIG. 13 is a structural block diagram of a system for UDP-based streaming media network transmission according to the sixth embodiment of the present application.

A system for UDP-based streaming media network transmission according to the sixth embodiment of the present application includes a client and a server for UDP-based streaming media network transmission described above. The server establishes network connection with the client.

The system for UDP-based streaming media network transmission provided by embodiments of the present application is used for: dividing video frame data to be sent into a plurality of sub-video frame packets, sending a sub-video frame packet with a preset serial number to a client, and receiving a response message sent by the client, wherein the response message includes a first serial number corresponding to at least one sub-video frame packet that the client requires the server to send and a second serial number for the received sub-video frame packet; sending a sub-video frame packet corresponding to the first serial number to the client, and determining whether the client has received all sub-video frame packets of the video frame data, based on the first serial number and the second serial number; if the client has received all sub-video frame packets of the video frame data, calculating the actual bandwidth of the current network based on the sending start time of the first sub-video frame packet of the video frame data, the sending end time of the last sub-video frame packet of the video frame data and the size of the video frame data, which provides a basis for the self-adaption of the encoding rate.

The present application aims to claim a method, server and system for calculating bandwidth of UDP-based streaming media network transmission, which can accurately calculate the actual bandwidth of the current network, and provides a basis for the self-adaption of the encoding rate.

It can be understood by a person skilled in the art that all or a part of steps in the above embodiments can be carried out by hardware or by related hardware being instructed by a program, which can be stored in computer readable storage media, including a memory, a disk, an optical disk and the like.

It should be understood that the above specific embodiments of the present application are only for illustration or explanation of the principle of the present application, and are not intended to limit the present application. Thus, any modifications, alternatives, improvements or the like without departing from the spirit and scope of the present application shall be included in the protection scope of the present application. Moreover, the accompanying claims of the present application are intended to contain all such changes and modifications falling within the scope and limits of the appended claims or the equivalents of such range and limits.

To achieve the above objectives, embodiments of the present application further provide a storage medium, wherein the storage medium is configured to store an application program for performing a method for calculating bandwidth of UDP-based streaming media network transmission in the present application when being executed. The method for calculating bandwidth of UDP-based streaming media network transmission in the present application includes:

dividing video frame data to be sent into a plurality of sub-video frame data units, and encapsulating each sub-video frame data unit into a sub-video frame packet within a preset serial number;

sending sub-video frame packets with preset serial numbers to a client, and recording sending start time;

receiving a response message sent by the client, wherein the response message is generated based on a sub-video frame packet received by the client, and includes a first serial number corresponding to at least one sub-video frame packet that the client requires the server to send and a second serial number for the received sub-video frame packet;

extracting the first serial number and the second serial number from the response message, sending a sub-video frame packet corresponding to the first serial number to the client, and determining whether the client has received all sub-video frame packets of the video frame data based on the second serial number;

if the client has received all sub-video frame packets of the video frame data, recording sending end time of the last sub-video frame packet of the video frame data, and calculating network bandwidth based on the sending start time, the sending end time and the size of the video frame data.

To achieve the above objectives, embodiments of the present application further provide an application program, wherein, the application program is configured to implement the method for calculating bandwidth of UDP-based streaming media network transmission in the present application when being executed. The method for calculating bandwidth of UDP-based streaming media network transmission in the present application includes:

dividing video frame data to be sent into a plurality of sub-video frame data units, and encapsulating each sub-video frame data unit into a sub-video frame packet with a preset serial number;

sending sub-video frame packets with preset serial numbers to a client, and recording sending start time;

receiving a response message sent by the client, wherein the response message is generated based on a sub-video frame packet received by the client, and includes a first serial number corresponding to at least one sub-video frame packet that the client requires the server to send and a second serial number for the received sub-video frame packet;

extracting the first serial number and the second serial number from the response message, sending a sub-video frame packet corresponding to the first serial number to the client, and determining whether the client has received all sub-video frame packets of the video frame data based on the second serial number;

if the client has received all sub-video frame packets of the video frame data, recording sending end time of the last sub-video frame packet of the video frame data, and calculating network bandwidth based on the sending start time, the sending end time and the size of the video frame data.

To achieve the above objectives, embodiments of the present application further provide a computing device, which includes a processor, a memory, a communication interface and a bus;

the processor, the memory and the communication interface are connected and communicated with each other via the bus;

the memory stores executable program codes;

the processor executes the program corresponding to the executable program codes stored in the memory by reading the executable program codes, for:

dividing video frame data to be sent into a plurality of sub-video frame data units, and encapsulating each sub-video frame data unit into a sub-video frame packet with a preset serial number;

sending sub-video frame packets with preset serial numbers to a client, and recording sending start time;

receiving a response message sent by the client, wherein the response message is generated based on a sub-video frame packet received by the client, and includes a first serial number corresponding to at least one sub-video frame packet that the client requires the server to send and a second serial number for the received sub-video frame packet;

extracting the first serial number and the second serial number from the response message, sending a sub-video frame packet corresponding to the first serial number to the client, and determining whether the client has received all sub-video frame packets of the video frame data based on the second serial number;

if the client has received all sub-video frame packets of the video frame data, recording sending end time of the last sub-video frame packet of the video frame data, and calculating network bandwidth based on the sending start time, the sending end time and the size of the video frame data.

It should be noted that the relationship terms in the description and claims of the present application such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " and "include(s) a/an . . . " do not exclude that there are additional identical elements in the processes, methods, articles, or devices which comprise the listed elements.

Although the embodiments disclosed in the present application are described as above, the contents mentioned above are merely embodiments adopted to facilitate understanding of the technical solution of the present application, and not intended for limiting the present application. Any modification and variation in the form and detail of implementation can be made by any person skilled in the art to which the present application belongs without departing from the spirit and scope of the present application. However, the protection scope of the present application should be determined by the scope defined by the attached claims.

The invention claimed is:

1. A method for calculating bandwidth of UDP-based streaming media network transmission, which is applicable to a server, wherein the method comprises:

dividing video frame data to be sent into a plurality of sub-video frame data units, and encapsulating each sub-video frame data unit into a sub-video frame packet with a preset serial number;

sending sub-video frame packets with preset serial numbers to a client, and recording sending start time;

receiving a response message sent by the client, wherein the response message is generated based on a sub-video frame packet received by the client, and comprises a first serial number corresponding to at least one sub-video frame packet that the client requires the server to send and a second serial number for the received sub-video frame packet;

extracting the first serial number and the second serial number from the response message, sending a sub-video frame packet corresponding to the first serial number to the client, and determining whether the client has received all sub-video frame packets of the video frame data based on the second serial number;

if the client has received all sub-video frame packets of the video frame data, recording sending end time of the last sub-video frame packet of the video frame data, and calculating network bandwidth based on the sending start time, the sending end time and the size of the video frame data, wherein calculating network bandwidth comprises:
calculating a sending rate of a network, the sending rate being B/T; calculating the sum of sending rates for all video frame data sent within preset unit time, and calculating the average of the sum to obtain the network bandwidth;
wherein, B is equal to the sum of the size of the video frame data and the sizes of all sub-video frame packets corresponding to the first serial number sent during the sending of the video frame data, and T is equal to the time interval between the sending start time and the sending end time.

2. The method for calculating bandwidth of UDP-based streaming media network transmission of claim 1, wherein extracting the first serial number and the second serial number from the response message, sending a sub-video frame packet corresponding to the first serial number to the client, comprises:
extracting the first serial number and the second serial number from the response message, and accumulating a retransmission count of the sub-video frame packet corresponding to the first serial number;
sending the sub-video frame packet corresponding to the first serial number associated with the retransmission count to the client if the retransmission count is greater than a preset retransmission threshold.

3. The method for calculating bandwidth of UDP-based streaming media network transmission of claim 2, wherein after extracting the first serial number and the second serial number from the response message, the method further comprises:
deleting, from a sending buffer, sub-video frame packets with serial numbers that are smaller than the smallest serial number in the first serial numbers;
decreasing the count of sub-video frame packets which have been sent to the client but for which response messages comprising second serial numbers have not been received according to the number of the deleted sub-video frame packets.

4. The method for calculating bandwidth of UDP-based streaming media network transmission of claim 2, wherein sending the sub-video frame packet corresponding to the first serial number associated with the retransmission count to the client if the retransmission count is greater than a preset retransmission threshold, comprises:
determining whether the number of sub-video frame packets which have been sent to the client but for which response messages comprising second serial numbers have not been received reaches a preset number threshold;
if the number of sub-video frame packets which have been sent to the client but for which response messages comprising second serial numbers have not been received reaches the preset number threshold, selecting, from a sending buffer, a sub-video frame packet whose retransmission count is greater than the preset retransmission threshold according to a preset strategy, and sending the sub-video frame packet to the client;
if the number of sub-video frame packets which have been sent to the client but for which response messages comprising second serial numbers have not been received does not reach the preset number threshold, sending a sub-video frame packet, selected from the sending buffer, whose retransmission count is greater than the preset retransmission threshold, and sending new sub-video frame packets and accumulating the count of sub-video frame packets which have been sent to the client but for which response messages comprising second serial numbers have not been received based on the number of the new sub-video frame packets.

5. The method for calculating bandwidth of UDP-based streaming media network transmission of claim 4, wherein the preset strategy comprises: selecting, from the sending buffer, a sub-video frame packet with the smallest serial number in sub-video frame packets whose retransmission counts are greater than the preset retransmission threshold.

6. The method for calculating bandwidth of UDP-based streaming media network transmission of claim 1, wherein after obtaining the network bandwidth, the method further comprises:
adjusting an encoding rate of the transmission of the video frame data according to the network bandwidth.

7. A system for UDP-based streaming media network transmission, wherein the system comprises a client and a server for UDP-based streaming media network transmission, and the server establishes network connection with the client;
wherein the server performs following steps:
dividing video frame data to be sent into a plurality of sub-video frame data units, and encapsulating each sub-video frame data unit into a sub-video frame packet with a preset serial number;
sending sub-video frame packets with preset serial numbers to a client, and recording sending start time;
receiving a response message sent by the client, wherein the response message is generated based on a sub-video frame packet received by the client, and comprises a first serial number corresponding to at least one sub-video frame packet that the client requires a server to send and a second serial number for the received sub-video frame packet;
extracting the first serial number and the second serial number from the response message, sending a sub-video frame packet corresponding to the first serial number to the client, and determining whether the client has received all sub-video frame packets of the video frame data based on the second serial number;
if the client has received all sub-video frame packets of the video frame data, recording sending end time of the last sub-video frame packet of the video frame data, and calculating network bandwidth based on the sending start time, the sending end time and the size of the video frame data;
wherein calculating network bandwidth comprises:
calculating a sending rate of a network, the sending rate being B/T; calculating the sum of sending rates for all video frame data sent within preset unit time, and calculating the average of the sum to obtain the network bandwidth;
wherein, B is equal to the sum of the size of the video frame data and the sizes of all sub-video frame packets corresponding to the first serial number sent during the sending of the video frame data, and T is equal to the time interval between the sending start time and the sending end time.

8. A non-transitory storage medium, wherein the storage medium is configured to store an application program that is configured to perform the following steps when being executed:
dividing video frame data to be sent into a plurality of sub-video frame data units, and encapsulating each sub-video frame data unit into a sub-video frame packet with a preset serial number;

sending sub-video frame packets with preset serial numbers to a client, and recording sending start time;

receiving a response message sent by the client, wherein the response message is generated based on a sub-video frame packet received by the client, and comprises a first serial number corresponding to at least one sub-video frame packet that the client requires a server to send and a second serial number for the received sub-video frame packet;

extracting the first serial number and the second serial number from the response message, sending a sub-video frame packet corresponding to the first serial number to the client, and determining whether the client has received all sub-video frame packets of the video frame data based on the second serial number;

if the client has received all sub-video frame packets of the video frame data, recording sending end time of the last sub-video frame packet of the video frame data, and calculating network bandwidth based on the sending start time, the sending end time and the size of the video frame data, wherein calculating network bandwidth comprises:

calculating a sending rate of a network, the sending rate being B/T; calculating the sum of sending rates for all video frame data sent within preset unit time, and calculating the average of the sum to obtain the network bandwidth;

wherein, B is equal to the sum of the size of the video frame data and the sizes of all sub-video frame packets corresponding to the first serial number sent during the sending of the video frame data, and T is equal to the time interval between the sending start time and the sending end time.

9. A computing device, comprising a processor and a memory, wherein the memory stores executable program codes;

the processor executes a program corresponding to the executable program codes stored in the memory by reading the executable program codes, to perform a method for calculating bandwidth of UDP-based streaming media network transmission, wherein the method comprises:

dividing video frame data to be sent into a plurality of sub-video frame data units, and encapsulating each sub-video frame data unit into a sub-video frame packet with a preset serial number;

sending sub-video frame packets with preset serial numbers to a client, and recording sending start time;

receiving a response message sent by the client, wherein the response message is generated based on a sub-video frame packet received by the client, and comprises a first serial number corresponding to at least one sub-video frame packet that the client requires a server to send and a second serial number for the received sub-video frame packet;

extracting the first serial number and the second serial number from the response message, sending a sub-video frame packet corresponding to the first serial number to the client, and determining whether the client has received all sub-video frame packets of the video frame data based on the second serial number;

if the client has received all sub-video frame packets of the video frame data, recording sending end time of the last sub-video frame packet of the video frame data, and calculating network bandwidth based on the sending start time, the sending end time and the size of the video frame data;

wherein calculating network bandwidth comprises:

calculating a sending rate of a network, the sending rate being B/T; calculating the sum of sending rates for all video frame data sent within preset unit time, and calculating the average of the sum to obtain the network bandwidth;

wherein, B is equal to the sum of the size of the video frame data and the sizes of all sub-video frame packets corresponding to the first serial number sent during the sending of the video frame data, and T is equal to the time interval between the sending start time and the sending end time.

10. The computing device of claim 9, wherein extracting the first serial number and the second serial number from the response message, sending a sub-video frame packet corresponding to the first serial number to the client, comprises:

extracting the first serial number and the second serial number from the response message, and accumulating a retransmission count of the sub-video frame packet corresponding to the first serial number;

sending the sub-video frame packet corresponding to the first serial number associated with the retransmission count to the client if the retransmission count is greater than a preset retransmission threshold.

11. The computing device of claim 10, wherein after extracting the first serial number and the second serial number from the response message, the method further comprises:

deleting, from a sending buffer, sub-video frame packets with serial numbers that are smaller than the smallest serial number in the first serial numbers;

decreasing the count of sub-video frame packets which have been sent to the client but for which response messages comprising second serial numbers have not been received according to the number of the deleted sub-video frame packets.

12. The computing device of claim 10, wherein sending the sub-video frame packet corresponding to the first serial number associated with the retransmission count to the client if the retransmission count is greater than a preset retransmission threshold, comprises:

determining whether the number of sub-video frame packets which have been sent to the client but for which response messages comprising second serial numbers have not been received reaches a preset number threshold;

if the number of sub-video frame packets which have been sent to the client but for which response messages comprising second serial numbers have not been received reaches the preset number threshold, selecting, from a sending buffer, a sub-video frame packet whose retransmission count is greater than the preset retransmission threshold according to a preset strategy, and sending the sub-video frame packet to the client;

if the number of sub-video frame packets which have been sent to the client but for which response messages comprising second serial numbers have not been received does not reach the preset number threshold, sending a sub-video frame packet, selected from the sending buffer, whose retransmission count is greater than the preset retransmission threshold, and sending new sub-video frame packets and accumulating the count of sub-video frame packets which have been sent to the client but for which response messages comprising second serial numbers have not been received based on the number of the new sub-video frame packets.

13. The computing device of claim 12, wherein the preset strategy comprises: selecting, from the sending buffer, a sub-video frame packet with the smallest serial number in sub-video frame packets whose retransmission counts are greater than the preset retransmission threshold.

14. The computing device of claim 9, wherein after obtaining the network bandwidth, the method further comprises:
   adjusting an encoding rate of the transmission of the video frame data according to the network bandwidth.

\* \* \* \* \*